US009369685B2

(12) United States Patent
Drader et al.

(10) Patent No.: US 9,369,685 B2
(45) Date of Patent: Jun. 14, 2016

(54) MOBILE ELECTRONIC DEVICE HAVING CAMERA WITH IMPROVED AUTO WHITE BALANCE

(75) Inventors: Marc Drader, Waterloo (CA); Michael Lorne Purdy, Waterloo (CA); James Alexander Robinson, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 679 days.

(21) Appl. No.: 12/713,860

(22) Filed: Feb. 26, 2010

(65) Prior Publication Data

US 2011/0211089 A1    Sep. 1, 2011

(51) Int. Cl.
*H04N 9/73* (2006.01)
*H04N 1/00* (2006.01)

(52) U.S. Cl.
CPC .......... *H04N 9/735* (2013.01); *H04N 1/00307* (2013.01)

(58) Field of Classification Search
CPC .................................................. H04N 7/735
USPC ............................................. 348/222.1, 223.1
See application file for complete search history.

(56) References Cited

U.S. PATENT DOCUMENTS

| | | | |
|---|---|---|---|
| 4,855,814 A | 8/1989 | Shiraishi et al. | |
| 5,465,116 A | 11/1995 | Suzuki | |
| 5,555,022 A | 9/1996 | Haruki et al. | |
| 5,617,141 A | 4/1997 | Nishimura et al. | |
| 5,631,699 A | 5/1997 | Saito | |
| 6,008,863 A | 12/1999 | Jinnai | |
| 6,011,547 A | 1/2000 | Shiota et al. | |
| 6,529,235 B1 | 3/2003 | Tseng | |
| 7,010,160 B1 | 3/2006 | Yoshida | |
| 2003/0001958 A1 | 1/2003 | Hoshuyama | |
| 2003/0053686 A1 | 3/2003 | Luo et al. | |
| 2003/0160876 A1* | 8/2003 | Miyao et al. ............... | 348/223.1 |
| 2003/0197879 A1 | 10/2003 | Terashita | |
| 2005/0036035 A1 | 2/2005 | Takemoto | |
| 2005/0041114 A1 | 2/2005 | Kagaya | |
| 2005/0046724 A1 | 3/2005 | Kagaya | |
| 2006/0114335 A1 | 6/2006 | Hara et al. | |
| 2006/0238623 A1 | 10/2006 | Ogawa | |
| 2007/0002150 A1 | 1/2007 | Abe | |
| 2007/0052821 A1 | 3/2007 | Fukui | |
| 2007/0248342 A1 | 10/2007 | Tamminen et al. | |
| 2008/0037975 A1 | 2/2008 | Nakajima | |
| 2010/0321523 A1* | 12/2010 | Subbotin ................... | 348/223.1 |

OTHER PUBLICATIONS

Kim, Yoon, et al.; "A Video Camera System With Enhanced Zoom Tracking and Auto White Balance;" IEEE Transactions on Consumer Electronics; vol. 48, No. 3; Aug. 2002; 7 pages.

(Continued)

*Primary Examiner* — Tuan Ho
(74) *Attorney, Agent, or Firm* — Conley Rose, P.C.; J. Robert Brown, Jr.

(57) ABSTRACT

An improved mobile electronic device and camera provide an improved auto white balance system where constraints can be imposed the correlated color temperature (CCT) that is employed by the auto white balance system. For instance, if a distance between a subject and the camera is determined to exceed a threshold for closeness, the CCT can be constrained so that it is above a preset CCT that corresponds with sunrise or sunset. Other distance thresholds and the content of an image, as well as the brightness of the image, can be further employed in determining the CCT to employ.

2 Claims, 3 Drawing Sheets

(56) References Cited

OTHER PUBLICATIONS

European Examination Report; Application No. 10154963.2; Jun. 14, 2012; 3 pages.

European Examination Report; Application No. 10154963.2; Jan. 30, 2013; 5 pages.

Canadian Office Action; Application No. 2,732,556; May 2, 2013; 2 pages.

* cited by examiner

MOBILE ELECTRONIC DEVICE HAVING CAMERA WITH IMPROVED AUTO WHITE BALANCE

BACKGROUND

1. Field

The disclosed and claimed concept relates generally to mobile electronic devices and, more particularly, to a mobile electronic device having a camera that includes an improved auto white balance, and an associated method.

2. Description of the Related Art

Numerous types of mobile electronic devices are known. Examples of such mobile electronic devices include, for instance, personal data assistants (PDAs), mobile computers, two-way pagers, cellular telephones, and the like. Many mobile electronic devices also feature a wireless communication capability, although many such mobile electronic devices are stand-alone devices that are functional without communication with other devices.

Some mobile electronic devices and other electronic devices employ small cameras which can generate images such as still photographs and video that are then stored on the electronic device. Such cameras typically comprise a camera lens, a sensor, and a processor system that are manufactured and sold as a modular unit. That is, the sensor receives light through the camera lens and provides an image signal to an embedded program stored and executed on the processor system in order to process the image in various ways. For instance, the image might be processed to compensate for various shortcomings of the camera lens. Additionally or alternatively, an image may be subjected to an auto white balance system.

While such mobile electronic devices and cameras have been generally effective for their intended purposes, such cameras have not come however, been without limitation. Some cameras possess limited processing capabilities and often have no frame store, which makes image processing difficult to achieve successfully in all situations. For instance, photos taken by a camera can have a poor color contrast or unnatural colors depending upon processing by an auto white balance system. It thus would be desirable to provide an improved mobile electronic device having a camera with an improved auto white balance system.

BRIEF DESCRIPTION OF THE DRAWINGS

A full understanding of the disclosed and claimed concept can be obtained from the following Description when read in conjunction with the accompanying drawings in which:

Similar numerals refer to similar parts throughout the specification.

DESCRIPTION

Figure 1:
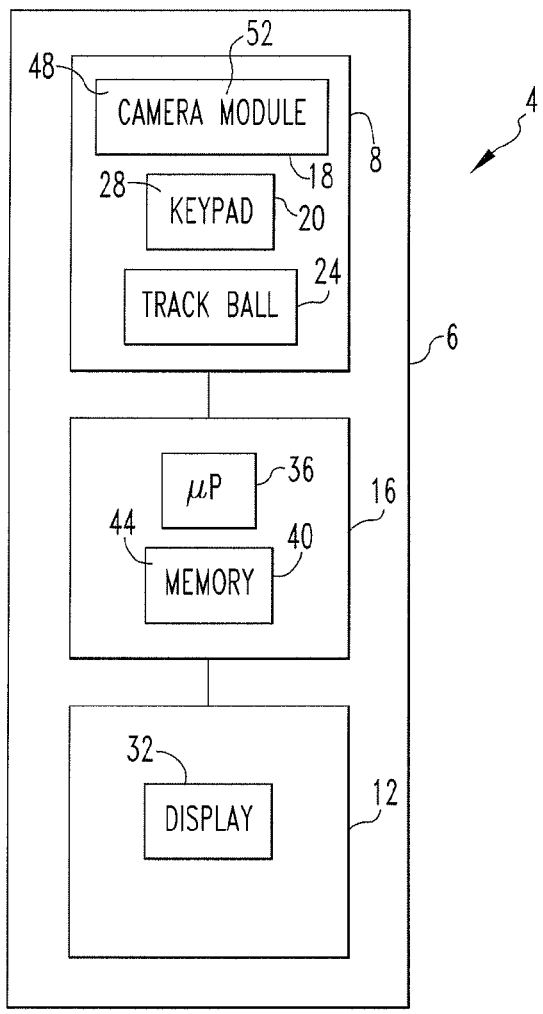
FIG. 1 is a schematic depiction of an exemplary mobile electronic device in accordance with the disclosed and claimed concept.

An improved mobile electronic device 4 in accordance with the disclosed and claimed concept is depicted schematically in FIG. 1. The improved mobile electronic device 4 comprises a housing 6, and further comprises an input apparatus 8, an output apparatus 12, and a processor apparatus 16 disposed on the housing 6. The input apparatus 8 provides input to the processor apparatus 16. The processor apparatus 16 provides output signals to the output apparatus 12 which, in the embodiment described herein, comprises a display 32.

The input apparatus 8 comprises a camera module 18 and may further include a keypad 20 or a track ball 24 or both. The keypad 20 in the exemplary embodiment herein comprises a plurality of keys 28 that are each actuatable to provide input to the processor apparatus 16. The track ball 24 is rotatable to provide navigational and other input to the processor apparatus 16, and additionally is translatable in a direction inwardly toward the mobile electronic device 4 to provide other input, such as selection inputs. The track ball 24 is freely rotatable on the housing 6 and thus is able to provide navigational inputs in the vertical direction, i.e., the up-down direction, in the horizontal direction, i.e., the left-right direction, as well as combinations thereof. The keys 28 and the track ball 24 serve as input members which are actuatable to provide input to the processor apparatus 16.

Examples of other input members not expressly depicted herein would include, for instance, a mouse or track wheel for providing navigational inputs, such as could be reflected by movement of a cursor on the display 32, and other inputs such as selection inputs. Another exemplary input member may be an optical trackpad, which may be responsive to movements like the rotational movements that would rotate the track ball 24, and depressions like those that would depress the track ball 24. Still other exemplary input members would include a touch-sensitive display, a stylus pen for making menu input selections on a touch-sensitive display displaying menu options and/or soft buttons of a graphical user interface (GUI), hard buttons disposed on the housing 6 of the mobile electronic device 4, and so on. Examples of other output devices would include a touch-sensitive display, an audio speaker, and so on.

The processor apparatus 16 comprises a processor 36 and a memory 40. The processor 36 may be, for example and without limitation, a microprocessor (µP) that interfaces with the memory 40. The memory 40 can be any one or more of a variety of types of internal and/or external storage media such as, without limitation, RAM, ROM, EPROM(s), EEPROM (s), FLASH, and the like that provide a storage register, i.e., a machine readable medium, for data storage such as in the fashion of an internal storage area of a computer, and can be volatile memory or nonvolatile memory. The memory 40 has stored therein a number of routines 44 that are executable on the processor 36. As employed herein, the expression "a number of" and variations thereof shall refer broadly to any nonzero quantity, including a quantity of one. One of the routines 44 is a graphical user interface (GUI) routine that is operable to provide visual output on the display 32 in response to input.

The camera module 18 comprises an image sensor 48 having a lens. The camera module further comprises a processor system 52 that receives signals from the image sensor 48 and subjects the image signals to one or more image processing operations.

One of the operations that is performed by the processor system 52 on image data is an auto white balance operation that can be said to be performed by an auto white balance system. Advantageously, the improved auto white balance system employed on the camera module 18 provides improved processing by imposing certain constraints upon the correlated color temperature (CCT) that can be employed by the auto white balance in processing an image. As is generally understood, the typical methodology for the processing of an image includes determining the identity of an illuminant of the scene that has been captured in the image. The illuminant is the source of electromagnetic energy that has illuminated the subject of the image and is typically identified as one of a number of predetermined natural and artificial lighting conditions of differing intensities. As employed herein, the expression "predetermined" and variations thereof refers generally to something that is determined, set, or is otherwise established in advance of another event. The methodology then includes scaling red, blue, and sometimes green color intensities to conform to the illuminant. The camera module 18 employs a plurality of preset CCTs stored thereon that are each reflective of a typical illumination scenario. By way of example, the midday sun in Western European/Northern Europe is a "daylight" natural light illuminant that is referred by the designation D65 and that has a correlated color temperature of about 6500 degrees Kelvin. Other known preset CCTs that are stored on the processor system 52 for use by the auto white balance may include, by way of example:

| CCT (Degrees Kelvin) | Description of Color Temperature |
| --- | --- |
| 1500 | Candle |
| 1800 | Sunlight at dawn |
| 2000 | High pressure sodium light |
| 2700 to 3000 | Conventional incandescent light |
| 2800 | Warm white fluorescent light |
| 3000 | Halogen light |
| 3200 | Sunrise/sunset |
| 3400 | Tungsten lamp |
| 4000 | Cool white fluorescent light |
| 4500 to 5000 | Xenon lamp |
| 5000 | Sunlight at midday |
| 5500 to 5600 | Electric photo flash |
| 6000 | Mercury vapor light |
| 6500 | Daylight (D65) |
| 6500 to 7500 | Overcast sky |
| 9000 to 12000 | Blue sky |

In typical operation, the processor system 52 collects autofocus (AF) data such as by determining the physical distance between the camera module 18 and the subject of an image. Auto exposure (AE) data is also collected, which provides an estimate of the brightness of the illuminant on the scale of, for example, 0 lux to 500 klux, for instance. The camera module 18 may further gather image signal processing (ISP) data to determine certain content regarding the image, such as whether the image includes a horizon which would delineate a blue sky, whether the scene is backlit, whether the scene comprises a face, whether the scene is high-contrast, whether the scene comprises a predominance of snow or sand, and the like. Additionally, some initial information for the auto white balance algorithm is gathered, such as would determine whether a significant portion of the image includes a dominant color. The system then typically employs one or more of these data to process image data in various fashions.

Advantageously, the auto white balance system of the instant application employs AF distance data to impose certain constraints upon the CCT that can be employed by the auto white balance system in certain circumstances. By way of example, one or more predetermined distance thresholds may be established and stored on the processor system 52, and if it is determined that the distance between the camera module 18 and the subject of an image meets or exceeds one such threshold, a particular constraint that corresponds with the threshold is imposed on the auto white balance system.

Numerous such constraints can be employed. For instance, a predetermined threshold might be whether the distance between the camera module 18 and the subject is equal to or less than a predetermined macro distance, such as ten centimeters. That is, the threshold potentially is a distance between the subject and the camera module 18 of ten centimeters, and if the threshold is met or exceeded by the distance being ten centimeters or less, respectively, a constraint that corresponds with the aforementioned threshold is imposed on the CCT. In the instant example, the constraint that is imposed may be that the CCT that is employed by the auto white balance system must be greater than a preset CCT for sunrise/sunset which, in the present example, is indicated elsewhere herein as being 3200 degrees Kelvin. If the CCTs that are available for use by the auto white balance are the present ones set forth above, this would mean that the auto white balance could choose a CCT of 3400 degrees Kelvin (tungsten lamp) or a higher CCT for the processing of the image. The reason for constraining the CCT in such a fashion is that for close-up macro photos, very little likelihood exists that the lighting of the image is by relatively dime natural light at sunrise or sunset or an illuminant of equivalent brightness.

Such a constraint on the CCT can have numerous benefits. For example, a rose may have a predominant color of red. However, if a close-up short distance macro photo of the rose is taken with the auto white balance employing a CCT that corresponds with sunset, the true red color of the rose may be undesirably shifted from its true color by the auto white balance system. Such a scenario might occur if the auto white balance system erroneously thinks that the reddish nature of the image has resulted from natural sunlight at sunset. Advantageously, therefore, by providing the constraint on the improved auto white balance system to employ a CCT greater than 3200 degree Kelvin in the instant example, the predominance of the red coloration in the image data can be effectively ignored by the auto white balance system. The original red color will thus remain in the photo without being undesirably compensated by the auto white balance system to an incorrect color.

By way of further example, if it is determined that the distance between the camera module 8 and the subject is very far, i.e., in excess of ten meters, this may result in a predetermined constraint on the auto white balance system to employ a CCT that is higher than the preset correlation for cool fluorescent light which, in the example set forth herein, is 4000 degrees Kelvin. The reasoning for such a constraint in this situation is that at long distances the illuminant is unlikely to be, for instance, incandescent or fluorescent lighting and rather is likely to be natural lighting at midday, or be brighter still, by way of example.

Numerous other scenarios can trigger pre-established constraints on the CCT that is employed as the detected illuminant by the auto white balance system. For instance, if the content of an image is determined to include a backlit scene, it can be assumed that the illumination is daylight and thus result in a constraining of the CCT to be 5000 degrees Kelvin or above. Similarly, an indication that the content of an image includes a predominance of snow or sand may similarly trigger the constraint that the CCT be 5000 degrees Kelvin or higher. By way of a further example, it may be determined that the image includes a line or other delineation of a horizon as would suggest the existence of a blue sky, which again may trigger the imposition of the constraint that the CCT be 5000 degrees Kelvin or higher. In this latter circumstance, and depending upon the AE data brightness of the image, it may be desirable to impose as the constraint that the CCT must be 9000 degrees Kelvin or higher, by way of further example.

It should be understood from the foregoing that any of a variety of data can be detected to constrain the auto white balance in a predetermined fashion and that other scenarios are possible. For instance, the AE data that is indicative of the brightness of the illuminant can be employed to further specify the CCT that is already constrained in the aforementioned fashion. As already been suggested, the determination that the content of the image includes a delineation of sky might constrain the auto white balance to employ a CCT of 5000 degrees Kelvin or above, but the AE data may indicate a very high level of illumination of, for instance, 500 klux, which would indicate that the CCT should be further constrained to being 9000 degrees Kelvin or above.

Still alternatively, it may be desirable to pulse a strobe or other known light source that is a part of the camera module 18 in order to impinge on the subject a predetermined type of light in order to evaluate the difference in image data between the non-strobe illuminated condition and the strobe-illuminated condition. Other uses of data and corresponding constraints on the auto white balance will be apparent to one skilled in the art.

Figure 2A:
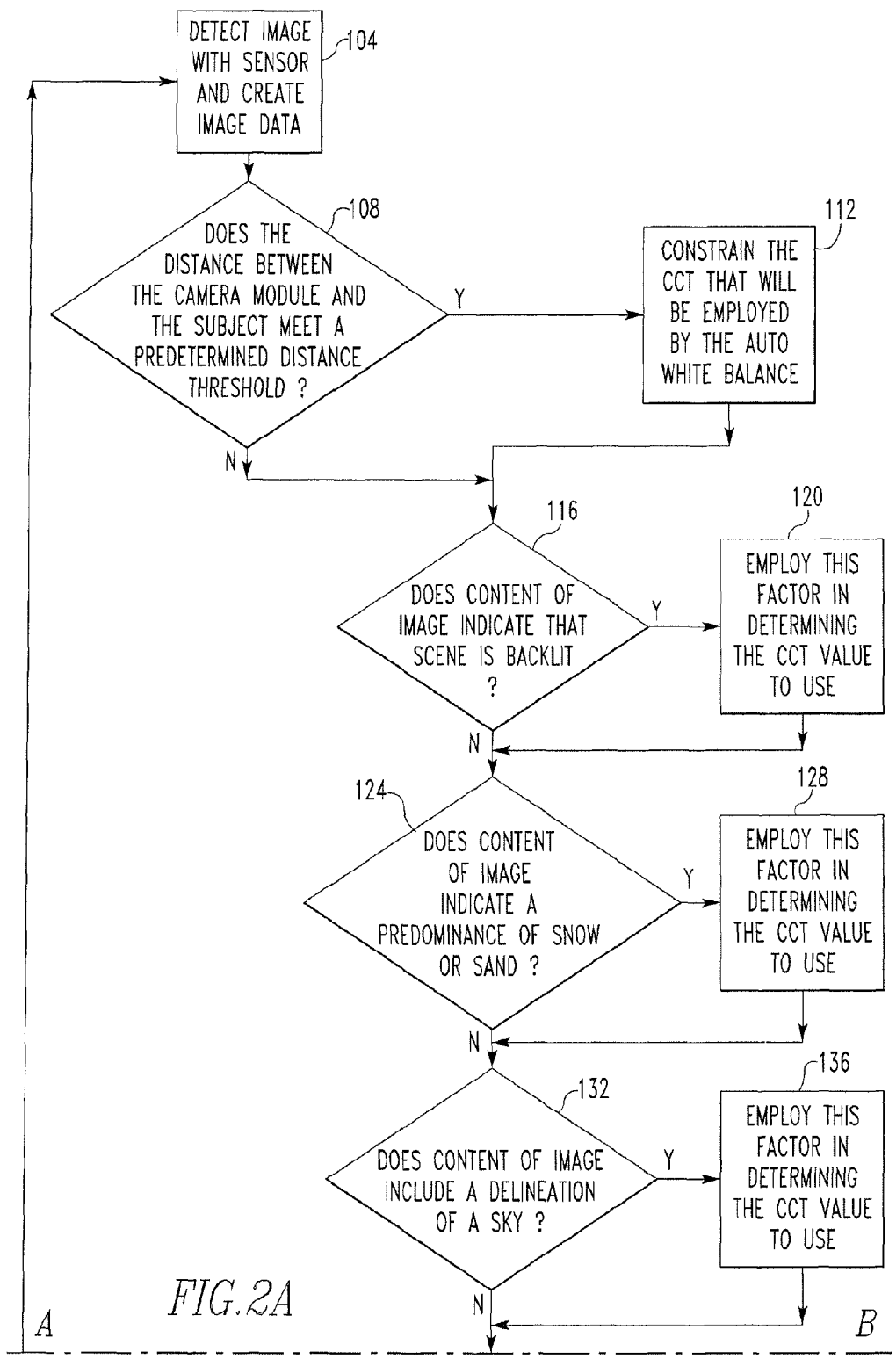
FIG. 2, which is presented as FIG. 2A and FIG. 2B, is a flowchart depicting certain aspects of an improved method that can be performed on the mobile electronic device of FIG. 1.
Figure 2B:
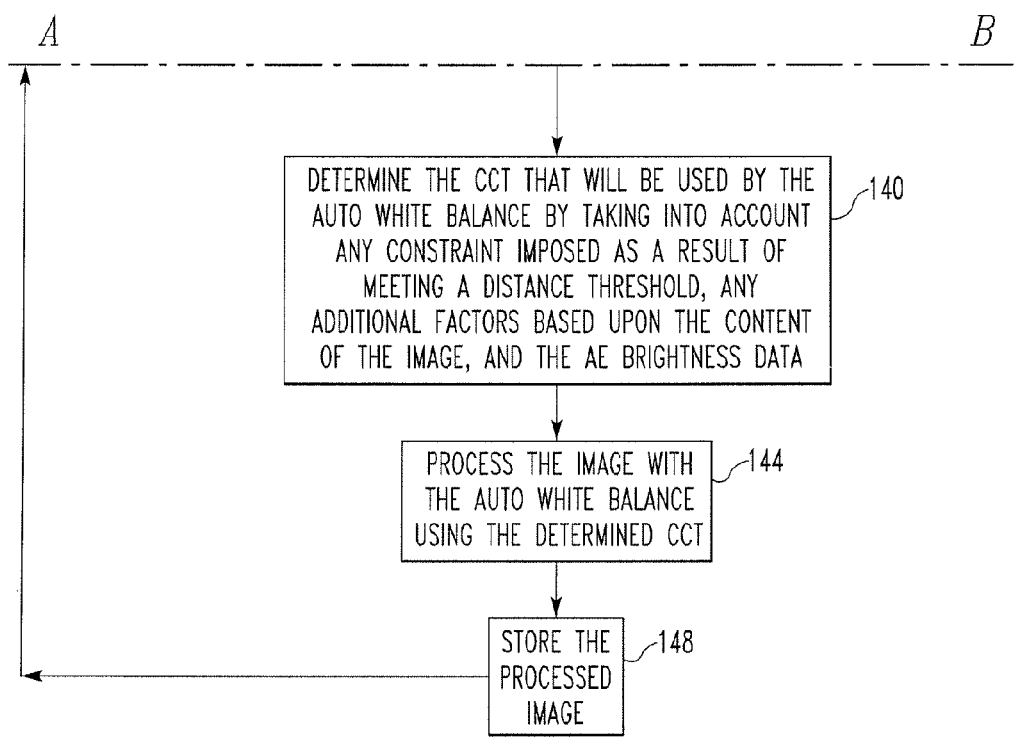

An exemplary flowchart depicting certain aspects of an improved method is depicted generally in FIG. 2. Processing begins, for instance, at 104 where an image is received by the sensor 48, and image data is provided by the sensor 48 to the processor system 52. Processing continues, as at 108, where it is determined whether a physical distance between the camera module 18 and the subject of an image meet or exceed a predetermined threshold. As set forth above, one such threshold is the distance being at or less than a close-up macro distance range, and an example of such a threshold being exceeded is if the macro distance range is ten centimeters and the distance between the subject and the camera module 18 is determined to be six centimeters. Another such threshold is when the distance is at or beyond that where incandescent light and fluorescent light are unlikely to be the illuminant of the subject. If either threshold or another such predetermined threshold is met or exceeded, processing continues, as at 112, where the constraint that corresponds with the aforementioned threshold is imposed upon the CCT to limit the CCT that can be detected and employed by the auto white balance system.

From both 108 and 112, processing continues, as at 116, where it is determined whether the content of the image suggests that the image includes a backlit portion. If such backlighting of the scene is detected at 116, the fact of such backlighting is employed, as at 120, in further establishing the CCT that will be used by the auto white balance. In the situation where backlighting is detected, a relatively higher CCT likely would be chosen than if the determination at 116 is negative.

From both 116 and 120, processing continues, as at 124, where it is determined whether the content of the image indicates a predominance of snow or sand. If so, processing continues, as at 128, where this determination is used in further establishing the CCT that will be employed by the auto white balance, as at 128. In the situation where a predominance of snow or sand is detected, a relatively higher CCT likely would be chosen than if the determination at 124 is negative.

Processing continues from 124 and 128 to 132 where it is determined whether the content of the image includes a delineation between a horizon and terrestrial regions, such as would indicate the existence of a sky, i.e., a blue sky or otherwise. Such a determination can potentially be further limited by a determination that the detected horizon is linear and is oriented horizontally depending upon the orientation of the camera module 18. If the existence of such a sky is detected, as at 132, processing continues, as at 136, where the fact of such a sky is used in further determining the CCT that will be employed by the auto white balance.

Processing continues from both 132 and 136 to 140 where the CCT that will be used by the auto white balance is determined in accordance with any constraint that is imposed, as at 112, based at least in part upon the meeting of a distance threshold. The CCT is further determined in accordance with any further inputs that are provided, as at 120, 128, and 136, and may be further determined in accordance with the AE data of detected brightness. Processing then continues, as at 144, where the image data is processed with the auto white balance using the CCT that was determined at 140. The image is then stored, as at 148, and is potentially output on the display 32. Processing thereafter returns to 104 where a further image can be detected.

It thus can be seen that various data detected by the sensor 48 is employed by the processor system 52 in providing an improved auto white balance system by imposing constraints upon the CCT that can be employed by the auto white balance system in processing image data. As mentioned above, distance thresholds can be established, which, if met, will result in the imposition of a corresponding constraint on the CCT that will be used by the auto white balance. Additionally or alternatively, the content of the image can be assessed to determine whether further adjustment to the CCT is warranted. Additionally, the brightness of the illuminant can provide data that is useful in determining the CCT to employ. Still other inputs can be employed, such as by detecting the result of a brief strobe flash on the subject to determine the result of a known quantity of light striking the subject, and this can further be used to determine the CCT to employ by the auto white balance.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A mobile electronic device comprising:
   a processor configured to execute a camera module with an auto white balance system, wherein the auto white balance system is configured to:
   determine whether a distance between the device and an object exceeds at least one predefined threshold,
   select, in response to determining the distance exceeds a predefined threshold, a correlated color temperature corresponding to the predefined threshold, wherein the correlated color temperature is at least higher than a predefined correlated color temperature for sunrise/sunset condition, and
   apply the selected correlated color temperature in processing an image of the object.

2. The mobile electronic device of claim 1, wherein the auto white balance system is further configured to ignore a dominant color of the object.

* * * * *